United States Patent [19]

Zanardi

[11] 4,330,943
[45] May 25, 1982

[54] TESTING DEVICE FOR PASSING INSIDE CALIPER GAUGES THROUGH PIPES AND THE LIKE

[75] Inventor: Stefano Zanardi, Ponte S. Pietro, Italy

[73] Assignee: Lazzari S.p.A., Ponte S. Pietro, Italy

[21] Appl. No.: 219,778

[22] Filed: Dec. 23, 1980

[30] Foreign Application Priority Data

Jan. 7, 1980 [IT] Italy .............................. 19069 A/80

[51] Int. Cl.³ .................................................. G01B 5/08
[52] U.S. Cl. ................................ 33/178 R; 33/178 B; 33/178 F
[58] Field of Search ............. 33/178 R, 178 B, 178 F, 33/143 R, 147 K, 168 B

[56] References Cited

U.S. PATENT DOCUMENTS

| | | | |
|---|---|---|---|
| 1,805,343 | 5/1931 | Robbins | 33/178 R |
| 2,226,078 | 12/1940 | Spahn | 33/178 R |
| 2,888,751 | 6/1959 | Pedrick | 33/178 R |
| 3,872,600 | 3/1975 | Siminsky | 33/178 R |
| 4,028,811 | 6/1977 | Hutter et al. | 33/178 F |
| 4,058,901 | 11/1977 | Lendi et al. | 33/178 R |

Primary Examiner—Willis Little
Attorney, Agent, or Firm—Ladas & Parry

[57] ABSTRACT

The inventive device (FIG. 1) comprises a hollow head 14 accommodating a resilient bush 22 having a slider 26 which is axially adjustable by means of an adjusting screw 30. Said bush is slotted to give radial leaf springs which co-operate with balls 36 held in recesses provided in hollow head 14 so as to be maintained in spring engagement with a slot 38 provided within a sleeve 16, which slideably accommodates said head 14 and removably holds caliper gauge D. When the latter becomes accidentally jammed in pipe A, operative connection between hollow head 14 and said sleeve 16 is cut off and said head is conveniently allowed to move forward and then quickly backward to bump against the jammed caliper gauge and knock it out of the pipe.

12 Claims, 3 Drawing Figures

TESTING DEVICE FOR PASSING INSIDE CALIPER GAUGES THROUGH PIPES AND THE LIKE

DESCRIPTION

The present invention relates to a testing device for passing inside caliper gauges through pipes and the like.

Dimensional testing of pipes for special use is currently governed by various international standards. In particular, the inside dimensions of pipes are checked by means of an inside caliper gauge and pipes which said inside caliper gauge cannot pass through are rejected. This check is generally performed automatically in order to cut testing time by using a so called "gauge guiding machine", which is equipped with a rod holding the inside caliper gauge at one end thereof, said inside caliper gauge being passed through a pipe under test to determine cylindricity or the like. This testing method is, however, open to the risk of the inside caliper gauge getting stuck in the pipe in case of pipe defects or faults. This disadvantage is made worse by the circumstance that the jamming action is enhanced by the inertia of the masses which are moved at a high speed for the sake of cutting testing time.

Attempts have been made to remove these disadvantages by using means for controlling the forward thrust which the inside calliper gauge is imparted by the drive assembly. Possible gauge jamming is, however, not prevented since considerably moving masses are at all times present in known machines, namely between the forward thrust limiting means and the caliper gauge. As a result thereof, removing the jam and restarting the gauge drive requires considerably time, especially when the gauge guiding machine is not equipped with emergency means for removing a jammed insider caliper gauge and the means designed to impart forward motion to the gauge holding rod does not provide the required thrust to knock the jammed gauge out of the pipe.

The invention intends to remove these and other disadvantages without substantially cutting the speed of the inside caliper gauge advancing in the test pipe while keeping at a minimum the accumulation of energy at the time of jamming, thus facilitating subsequent disjunction of these parts.

Another object of the invention is to provide a general pipe testing device which, in addition to preventing the disadvantages of a jammed inside caliper gauge, will make it possible to release the jammed parts quickly and safely without any damage to the caliper gauge.

The device according to the invention, wherein the inside caliper gauge is held by a supporting rod which is reciprocably operated by a motor through a kinematic chain with interposed coupling means which stop the forward motion of the inside caliper gauge within the pipe in the event of excess frictional resistance, is characterized by coupling means interposed between the supporting and advancing rod and the caliper gauge to cut off operative connection between these parts whenever said insider caliper gauge meets with resistance in its forward movement within the pipe.

In a convenient embodiment of the inventive device, the latter includes a hollow head which is secured to the supporting rod and is circumferentially provided with radially arranged recesses for radially movable coupling means, which can be brought into operative engagement with the inside caliper gauge and adjustable actuating means provided in said hollow head for imparting said coupling means an opposite force to the separating force at work between said hollow head and the inside caliper gauge.

The hollow head, of appropriate length, may slide within a sleeve and be fastened to said head through the coupling means. At its free end, the head terminates with a flange which, in engaging with the end of said sleeve, imparts to the latter and thereby the accidentally jammed pipe an opposite motion with respect to the forward direction of the inside caliper gauge so as to conveniently remove the jammed inside caliper gauge with the additional aid of a knocking action.

The invention will now be described in detail with reference to the accompanying drawing, which is illustrative, by way of example, of a preferred embodiment of inside caliper gauge incorporating the inventive device for automatic testing to be performed on pipes and the like.

Figure 1:
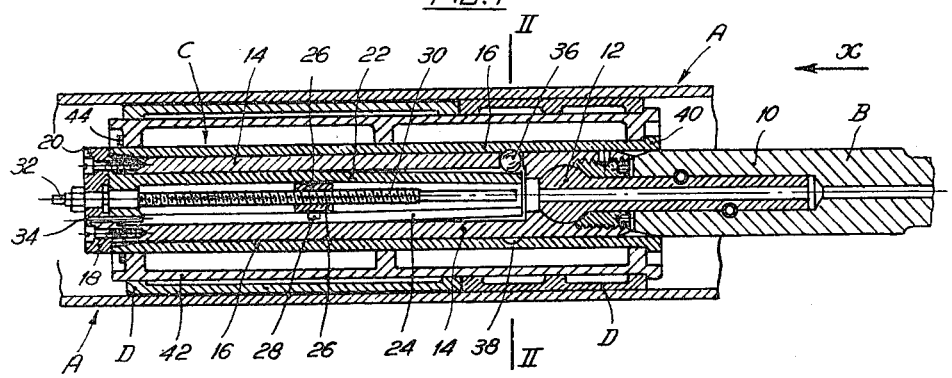
FIG. 1 is an axial sectional view of the inside caliper gauge according to the invention in its working position.
Figure 3:
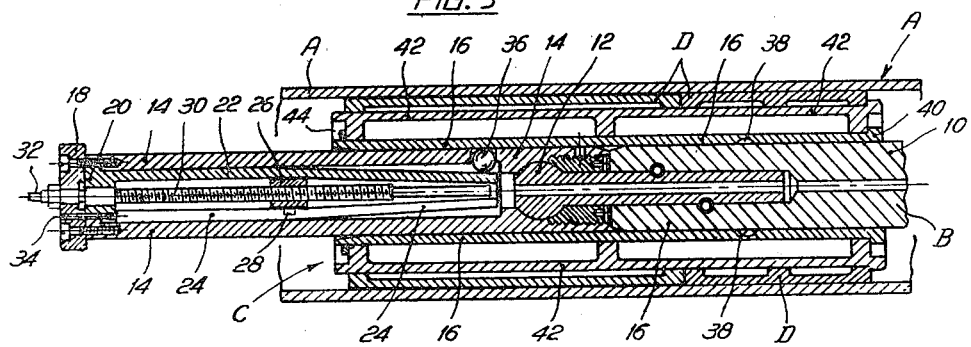

FIG. 3, a similar view to FIG. 1, shows the caliper gauge in its position ready to be knocked free from the pipe.

With reference to the figures in the drawing, letter A denotes a pipe under test, B the rod which removably holds device C with inside caliper gauge D. Rod B is operatively and suitably connected to a drive motor (not shown) for imparting the device a predetermined advancing speed within pipe A.

Figure 2:
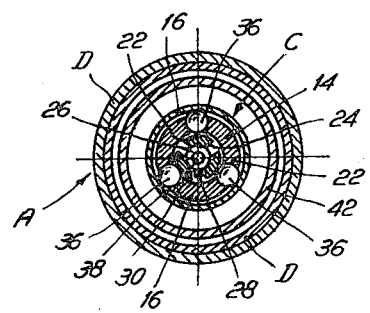
FIG. 2 is a sectional view taken along line II-II in FIG. 1.

Device C has a head 10 which is integral with or otherwise joined to rod B and is connected through a joint 12 to a hollow head consisting of a tubular body 14, which is slideably inserted into a sleeve 16 along with said head. Counterhead 14 has at the free end thereof a flange 18 engaging, as described hereinafter, with the edge of said sleeve 16 and also fastening said counterhead to flanged end 20 of a spring bush 22, which is internally coaxial to sleeve 16. Bush 22 has radial slots (see FIG. 2) which form radial sprung segments 24 the length of which may be varied as will be described hereinafter.

The other end of spring bush 22 is free and may, if desired, have an appropriate draught for expandable tapering. A slider 26 is slideably inserted in bush 22 and held at an angle relative to said bush by means of a pin 28, which engages with one of bush slots 24 and is axially movable by means of a threaded rod 30 which is rotatably so connected to flange 18 so that its operating head 32 projects from said flange to move slider 26 from the outside. Flange 18 is provided with a conveniently arranged hole 34, through which the axial position of slider 26 and hence the axial positions subsequently taken by said slider as well as the working length of spring segments in bush 22 may be checked by means of an indexed rod.

Counterhead 14 in the proximity of joint 12 is provided with a number of radial recesses for balls 36, said balls being interposed between spring segments 24 in bush 22 and an annular groove 38, which is provided within sleeve 16.

Sleeve 16 is provided at the other end thereof with a crown 40 forming a shoulder for firmly holding inside caliper gauge D. In order to test pipes A of different diameters, inside caliper gauge D itself is replaced, in the illustrative example, by an intermediate tubular body 42, which engages with crown 40 on its one side while being suitably fastened to counterhead 14 on its other side, by means, for example, of spring segments 44.

The above description clearly depicts the behaviour of the inventive device during examination and testing of pipe A. Rod B is imparted a forward motion in the direction shown by an arrow x in FIG. 1 to push device C-D into pipe A, the latter being held by a suitable support. If the pipe does not exhibit any irregularity or deformation, device C is moved backward on completion of its stroke and brought back to its initial position to test another pipe, and so on.

When inside caliper gauge D gets jammed in a defective pipe, a thrust from rod B, via slot 38 and balls 36, radially bends spring segments 24 in bush 22 thereby cutting off operative connection between said rod and inside caliper gauge D. As a result, in addition to immediately stopping the forward motion of inside caliper gauge D, any action of moving bodies upon said inside caliper gauge is prevented, whereby the jamming action is reduced and the jam can be easily removed.

In accordance with the invention, disjunction of the device, herein described, from a defective pipe is greatly simplified and does not require the use of any auxiliary means. After disjunction of device C from caliper gauge D, flange 18, which is fastened to rod B, is moved away and allowed to project by a suitable length from the end edge of sleeve 16 as shown in FIG. 3. Rod B is then moved along with hollow head 14 in the opposite direction of an arrow x at an appropriate speed, so that flange 18 bangs against sleeve 16 to unloose and knock inside caliper gauge D out of the defective pipe. Also the operative connection between rod B and device C-D is automatically restored since balls 36 are again engaged in slot 38 so that said device may resume the pipe checking and testing operation.

Accordingly, in the present invention, the kinetic energy of rod B and moving parts secured thereto, practically does not influence caliper gauge D when the latter becomes jammed in the pipe, whereby the degree of said jam is restricted. Further, the present invention provides easy and accurate control of the forward thrust value for the subject device, beyond which value rod B and inside caliper gauge D disengage from one another.

Joint 12, which is provided between head 10 and counterhead 14, will allow only small rotational movement of the end of rod B due to elasticity of the latter, which practically behaves like a beam bending under its own weight. Moreover, said joint prevents the formation of reactive moments on the device which might, during displacement of the latter, give rise to undesired friction during pipe testing.

Modifications and changes may be made to the subject device, particularly in relation to its specific use. For example, the connecting means between inside caliper gauge D and rod B may consist of breakable means which, under stress conditions, will break to disconnect said rod from device C-D. Spring means 22 may consist of coil or dish springs with compression being controlled by suitable means provided in counterhead 14 for actuation from the outside of said counterhead. Again in order to reduce and also remove the described disadvantages, inside caliper gauge D may be preceded by a suitably sensor which will pick up dimensional changes in pipe A and actuate electric contacts to lower the advancing speed of the device and hence the kinetic energy at work between caliper gauge and pipe.

The present protection obviously extends to automatic testing equipment for pipes such as used in methane pipelines, oil pipelines and the like.

Particulars regarding fabrication of the inventive device may vary while remaining within the scope of the invention and hence of the respective patent.

I claim:

1. A coupling device for use with an inside caliper gauge and a supporting rod for testing pipes and the like, comprising a first member for connection to the supporting rod to be driven by the rod in one direction into a pipe to be tested, a second member intermediate said first member and the inside caliper gauge for supporting said gauge inside the tube to be tested, and coupling means interposed between said first and second members for operatively connecting said first and second members, whereby the supporting rod drives the inside caliper gauge in said one direction within the pipe, said coupling means breaking operative connection between said members when said second member encounters resistance to movement in said one direction, thereby to stop movement of the inside caliper gauge.

2. A device according to claim 1, wherein said first member is hollow and is formed with radially arranged apertures at its periphery, and said coupling means comprise coupling members disposed in said recesses and radially movable therein between a projecting position, in which they engage the interior of said second member, and a retracted position, in which they are clear of said second member, and the device further comprises adjustable actuating means provided in the hollow interior of said first member for imparting to said coupling members a force urging them towards the projecting position.

3. A device according to claim 2, wherein said adjustable actuating means includes adjustable spring means effective between the coupling members and said first member.

4. A device according to claim 3, wherein said first member has a first end for attachment to the supporting rod and a second end which is remote from said first end; said coupling members comprise balls accommodated in part in said apertures, said second member is formed at its interior with an annular recess for receiving the balls when in the projecting position, and said adjustable spring means comprise an elongate spring bush having one and fastened to said first member at the second end thereof and engaging the balls at its other end.

5. A device according to claim 4, wherein said spring bush forms a plurality of spring segments, and the adjustable actuating means includes a slider which is slidably disposed within the spring bush and engaged by the spring segments, and an actuating member connected to the slider for adjusting its longitudinal position within the spring bush, thereby to change the inflection length of the spring segments and hence the force urging the balls to the projecting position.

6. A device according to claim 5, wherein said actuating member comprises a threaded rod which is supported by said first member at said second end thereof in such manner as to be rotatable with respect to said first member and is provided at said second end of the first member with operating means for rotating the rod with respect to the first member, said slider being provided with means for preventing rotation thereof with respect to the spring bush and to being in threaded engagement with said rod, whereby rotation of the rod by said operating means brings about movement of the slider with respect to the spring bush.

7. A device according to claim 5 or 6, including means for detecting the position of the slider with respect to the spring bush.

8. A device according to claim 1, wherein said first member has a first end for attachment to the supporting rod and a second end which is remote from said first end and is formed at said second end with an external flange for engaging the second member when the first member is moved in a direction opposite to said one direction for forcibly withdrawing the second member, and the inside caliper gauge supported thereby, from a pipe.

9. A device according to claim 1, including coupling means for connecting the first member to the supporting rod, said coupling means permitting a limited degree of angular movement between the supporting rod and said first member.

10. In combination, a coupling device according to claim 1 and a supporting rod connected to the first member by coupling means allowing a limited degree of angular movement between the supporting rod and the first member.

11. In combination, a device according to claim 1 and an inside caliper gauge supported on said second member.

12. A combination according to claim 11, wherein the inside caliper gauge is supported on the second member by means of a removable tubular body.

* * * * *